United States Patent
Xu et al.

(10) Patent No.: US 6,427,439 B1
(45) Date of Patent: Aug. 6, 2002

(54) METHOD AND SYSTEM FOR $NO_X$ REDUCTION

(75) Inventors: Lifeng Xu; Ching-Hsong George Wu, both of Farmington Hills; Robert Henry Hammerle, Franklin, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/615,427

(22) Filed: Jul. 13, 2000

(51) Int. Cl.[7] .................................................. F01N 3/00
(52) U.S. Cl. .............................. 60/286; 60/274; 60/295; 60/301
(58) Field of Search .......................... 60/274, 285, 286, 60/295, 301

(56) References Cited

U.S. PATENT DOCUMENTS

| | | | |
|---|---|---|---|
| 4,403,476 A | 9/1983 | Johnson et al. | |
| 4,854,123 A | 8/1989 | Inoue | |
| 5,201,802 A | 4/1993 | Hirota et al. | |
| 5,272,871 A * | 12/1993 | Oshima et al. | 60/286 |
| 5,369,956 A | 12/1994 | Dandel et al. | |
| 5,522,218 A | 6/1996 | Lane et al. | |
| 5,540,047 A | 7/1996 | Dahlheim et al. | |
| 5,609,022 A | 3/1997 | Cho | |
| 5,609,026 A | 3/1997 | Berriman et al. | |
| 5,628,186 A | 5/1997 | Schmelz | |
| 5,845,487 A | 12/1998 | Fraenkle et al. | |
| 5,924,280 A | 7/1999 | Tarabulski | |
| 5,950,422 A | 9/1999 | Dolling | |
| 5,992,141 A * | 11/1999 | Berriman et al. | 60/286 |
| 6,012,282 A * | 1/2000 | Kato et al. | 60/277 |
| 6,082,102 A * | 7/2000 | Wissler et al. | 60/286 |
| 6,089,015 A | 7/2000 | Strehlau et al. | |
| 6,119,448 A * | 9/2000 | Emmerling et al. | 60/286 |
| 6,119,451 A | 9/2000 | Vogtlin et al. | |
| 6,125,629 A * | 10/2000 | Patchett | 60/286 |
| 6,182,444 B1 * | 2/2001 | Fulton et al. | 60/286 |
| 6,209,313 B1 * | 4/2001 | Wissler et al. | 60/286 |
| 6,209,315 B1 * | 4/2001 | Weigl | 60/286 |
| 6,209,317 B1 * | 4/2001 | Hirota | 60/297 |

* cited by examiner

*Primary Examiner*—Thomas Denion
*Assistant Examiner*—Diem Tran
(74) *Attorney, Agent, or Firm*—Jerome R. Drouillard

(57) ABSTRACT

A system and method for controlling reductant injection upstream of a selective reduction catalyst (SCR) to overcome $NO_X$ inhibiting effects by injecting reductant in an amount proportional to engine out $NO_X$ concentration when the $NO_X$ concentration is above a predetermined level and injecting predetermined amounts of reductant into the SCR catalyst when engine out $NO_X$ concentration is below the predetermined level such as when the engine is idling or decelerating.

20 Claims, 6 Drawing Sheets

METHOD AND SYSTEM FOR $NO_X$ REDUCTION

TECHNICAL FIELD

The invention relates to a system and method for controlling reductant injection upstream of a selective reduction catalyst for use with an internal combustion engine.

BACKGROUND ART

In order to meet emission regulations, selective catalytic reduction (SCR) systems using externally added reducing agents are used. In such a system, regulated emissions, such as certain nitrogen oxides, or $NO_X$, can be reduced in an oxygen-rich environment to nitrogen over a catalyst when a reducing agent or reductant, such as urea water solution (urea) or ammonia (NH3), is added.

Current SCR systems are very effective in $NO_X$ reduction at temperatures above 250° C. and have potential to substantially reduce $NO_X$ emission from diesel vehicles. However, the $NO_X$ reduction efficiency of SCR systems using urea or ammonia as reductant is rather low at and below 200° C., which limits its overall $NO_X$ reduction efficiency for many diesel operation conditions.

Various systems for controlling ammonia injection are proposed in the prior art. These prior art systems inject urea in proportion to the $NO_X$ concentration level above certain temperatures. One approach to increase the SCR $NO_X$ reduction efficiency is to inject excess amount of reductants at low temperature. However, tests show that the addition of excess ammonia or urea increases the $NO_X$ reduction efficiency only slightly and may cause a large ammonia emission.

DISCLOSURE OF INVENTION

We have discovered that urea injected into a SCR catalyst is much more effective, if it is injected when the engine-out $NO_X$ concentration is below a threshold value, which is in the range of 25–75 ppm. The main effect is to significantly enhance the reductant storage on SCR catalysts under these conditions. The storage of reductant is only partially effective when the engine-out $NO_X$ is above that level. High $NO_X$ levels inhibit the adsorption of the reductant on active sites adjacent to $NO_X$ to promote $NO_X$ reduction especially at temperatures below 250° C.

The present invention proposes a new method of enhancing the SCR $NO_X$ reduction efficiency at low temperature. It involves injecting relatively larger amounts of reductant into the catalyst while the engine produces low $NO_X$ emission during idling or deceleration. This allows the reductant to be stored in the SCR catalyst before the catalyst is exposed to the high concentration of $NO_X$. The reductant injection is stopped when the catalyst storage capacity is nearly full. The resultant $NO_X$ reduction is much greater than without such storage. For example, excess urea was stored in SCR catalyst in engine deceleration condition, and upon subsequent acceleration, a largely enhanced $NO_X$ reduction efficiency was observed at low temperature. No reductant was injected into the system during the acceleration, so the only reductant available for $NO_X$ reduction was the urea (ammonia) pre-stored in the SCR catalyst. The $NO_X$ conversion at 200° C. was 90% compared to 60% for a similar test without such storage. The SCR $NO_X$ conversion light off (50% conversion) temperature was reduced about 60° C. from 210° C. to 150° C. The method of the present invention can greatly improve the SCR $NO_X$ reduction efficiency at low temperature for diesel vehicle applications.

In practice, a method of injecting urea when engine-out $NO_X$ is low may sometimes inject urea at the same point as a method of injecting urea when the catalyst temperature is low. The engine-out $NO_X$ level may be low at idle, for example. After running at idle for some time, the catalyst temperature may also be low. Therefore, both strategies would inject at idle. However, the strategies are different on decelerations. The method of the present invention being based on engine-out $NO_X$ would begin urea injection immediately on deceleration because the engine-out $NO_X$ level drops quickly. However, a method based on the catalyst temperature would not begin urea injection until the catalyst cooled down, which could take 20 to 60 seconds or perhaps never happen if the driver accelerates. In addition, the two strategies will respond differently to high EGR levels, which may provide low engine-out $NO_X$ levels while maintaining high catalyst temperatures. The method of the present invention provides more reductant to the active sites in the SCR catalyst to overcome $NO_X$ inhibition, and this increases $NO_X$ reduction efficiency.

In accordance with the present invention, a system and method for controlling ammonia injection upstream of a selective reduction catalyst (SCR) is disclosed that overcomes $NO_X$ inhibiting effects by injecting excess reductant into the SCR catalyst when engine-out $NO_X$ concentration is below a preset value such as when the engine is idling or decelerating. During these operations, the $NO_X$ adsorbed at the active sites is purged out by the low $NO_X$ exhaust flow, and the $NO_X$ inhibiting effects is minimized, thus the reductant can freely access the active sites to conduct a high $NO_X$ reduction process.

BEST MODE FOR CARRYING OUT THE INVENTION

Figure 1:
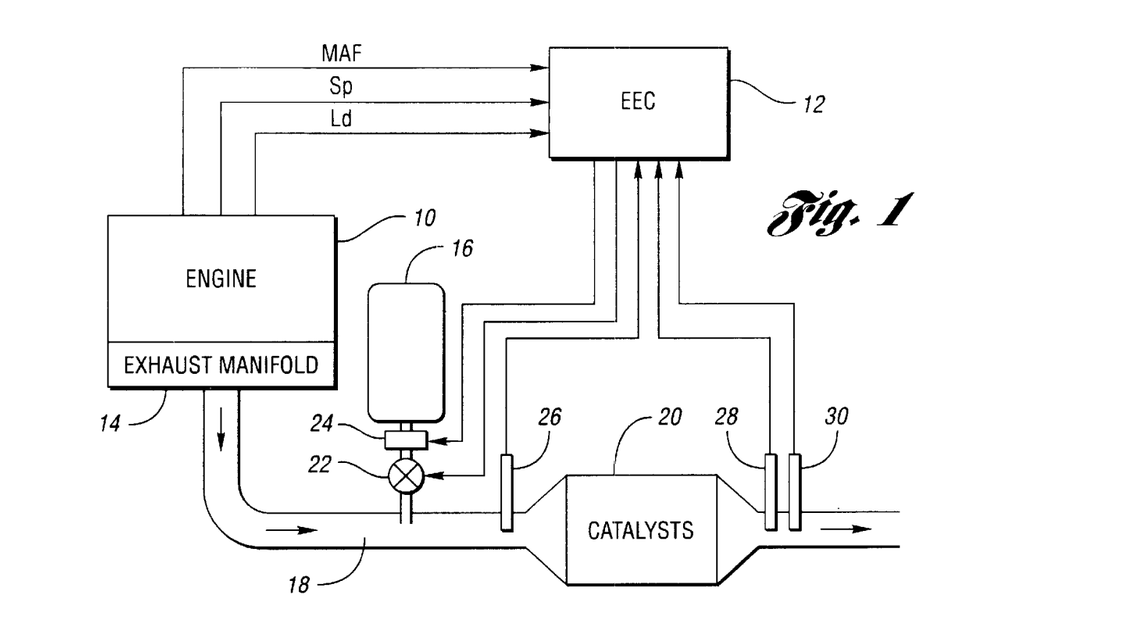
FIG. 1 is a schematic block diagram of a system for carrying out the method of the present invention.
Figure 2:
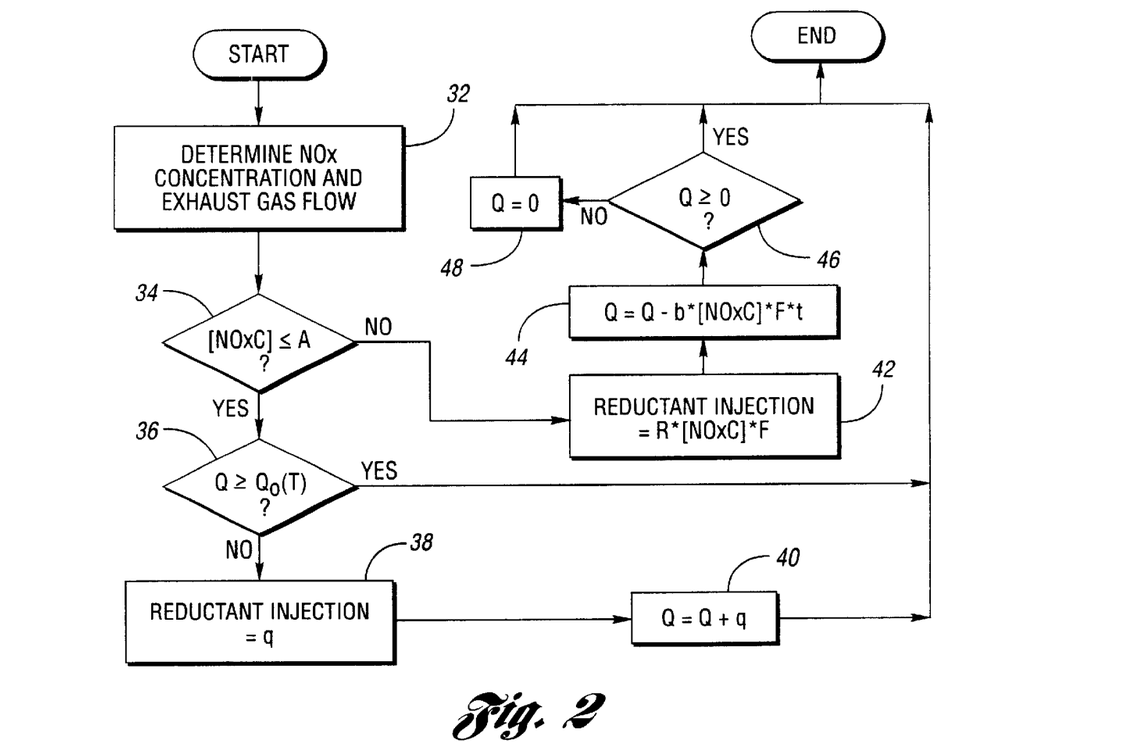
FIGS. 2–7 are flowcharts depicting the method of the present invention as applied to various system sensor configurations.

Referring now to the drawing and initially to FIGS. 1 and 2, a conventional engine 10 is controlled by an electronic engine controller (EEC) 12. The EEC 12 is conventional and includes the usual microprocessor unit, input/output ports, read-only memory, random access memory, and data bus. The EEC 12 receives inputs of engine speed (Sp), engine load (Ld) and mass air flow (MAF) as well as other inputs from various sensors including pressure, temperature and optional $NO_X$ and NH3 sensors to be discussed and delivers control signals for fuel injection and ignition timing to the engine and for reductant injection methods. Engine 10 includes a combustion chamber (not shown) that communicates with intake manifold (not shown) and an exhaust manifold 14.

A reducing agent, for example, urea, is stored in storage vessel 16 coupled to exhaust pipe 18 upstream of a selective reduction catalyst (SRC) 20. Preferably the SRC 20 is a Cu-β zeolite or other base metal catalyst. Control valve 22 controls the quantity of reductant delivered to the exhaust gases entering catalyst 20. Pump/pressure regulator 24 produces and maintains pressure of the reductant supplied to control valve 22. The valve 22 and pump/pressure regulator 24 are controlled by EEC 12 to achieve the desired injection rate of the reductant as will be described hereinafter in connection with FIG. 2. A temperature sensor 26 located at the inlet to the SRC 20 provides an input to the EEC 12 from which the temperature (T) of SRC 20 may be estimated. Alternatively, a direct reading of the catalyst temperature may be obtained by locating a thermocouple in the catalyst as is well known to those skilled in the art. Additional sensors such as a $NO_X$ sensor 28 and ammonia sensor 30, may be coupled to exhaust pipe 18 downstream of SRC 20, in order to provide respective indications to EEC 12 of the $NO_X$ and ammonia concentration of the exhaust gases in accordance with other embodiments of the invention that will be discussed in connection with FIGS. 3–5.

Referring now to FIG. 2 a flowchart of one embodiment of the method of the present invention is shown for a system configuration that does not include the optional $NO_X$ sensor 28 or the optional NH3 sensor 30, shown in FIG. 1. At block 32, the engine speed, engine load (which may be inferred from measured fuel flow), mass air flow to the engine, and temperature of the catalyst are determined directly from the available sensors or calculated in the EEC 12 based on sensor input. From a lookup table stored in the EEC 12, $NO_X$ concentration of the exhaust gas is determined based on engine speed and load inputs. The flow rate of the exhaust gas (F) is determined from a look up table based on the mass air flow, fuel flow, and temperature inputs. At block 34, a check is made to determine whether the $NO_X$ concentration $[NO_XC]$ is greater than a threshold value A. The $NO_XC$ threshold A may be between 50–150 ppm and is preferably about 95 ppm. If $NO_XC$ is equal to or less than A, a further check is made at block 36 to determine is the SCR catalyst is full i.e. is $Q=>Q_0(T)$ where Q is the amount of ammonia in the catalyst and $Q_0(T)$ is the ammonia storage capacity of the SCR catalyst, which is a function of catalyst temperature and may be obtained from a look up table stored in computer memory. $Q_0(T)$ related to the NH3 storage capacity of a given catalyst formulation, size, temperature and aging. Its value is generally high at low temperatures and low at high temperatures. Block 36 insures that no reductant is injected when the catalyst is full. If the catalyst is not full, then an amount q is injected as indicated as indicated at block 38 and the amount q is added to Q to arrive at a new value of reductant stored in the catalyst as indicated in block 40. As long as $NO_XC$ is not greater than A, the amount q is added to the SCR each time though the loop until the catalyst is full.

On the other hand, if $NO_XC$ is greater than the threshold A, the reductant is injected according to the formula (R*$[NO_XC]$*F) as indicated in block 42, where * indicates multiplication. R is dimensionless, and may vary from 0.8 to 1.3 during normal operation. Preferably, R is about 1 since this is the stoichiometric value of NH3 needed for $NO_X$ conversion. However during engine start, at low catalyst temperature, e.g., less than 120° C., when the catalyst is not active, R is set to 0 so that no reductant is injected. The value of R can be obtained from a look up table of R values. When the $NO_X$ concentration is higher than A, the value Q is also adjusted, at block 44, by subtracting the amount of reductant consumed (b*$[NO_XC]$*F*t), where $[NO_XC]$*F*t is the $NO_X$ concentration times the flow rate times the time(t)of one cycle, and b is an experimentally determined constant, which is related to a number of factors including catalyst temperature, catalyst formulation, flow rate, O2 level, and ammonia consumption rate. It may be between 1 and 2, and is preferably 1.3 for catalyst temperature below 350° C. A check is made at block 46 to insure that Q is always$\geq 0$. If Q is negative, then Q is reset to 0 at block 48.

Figure 3:
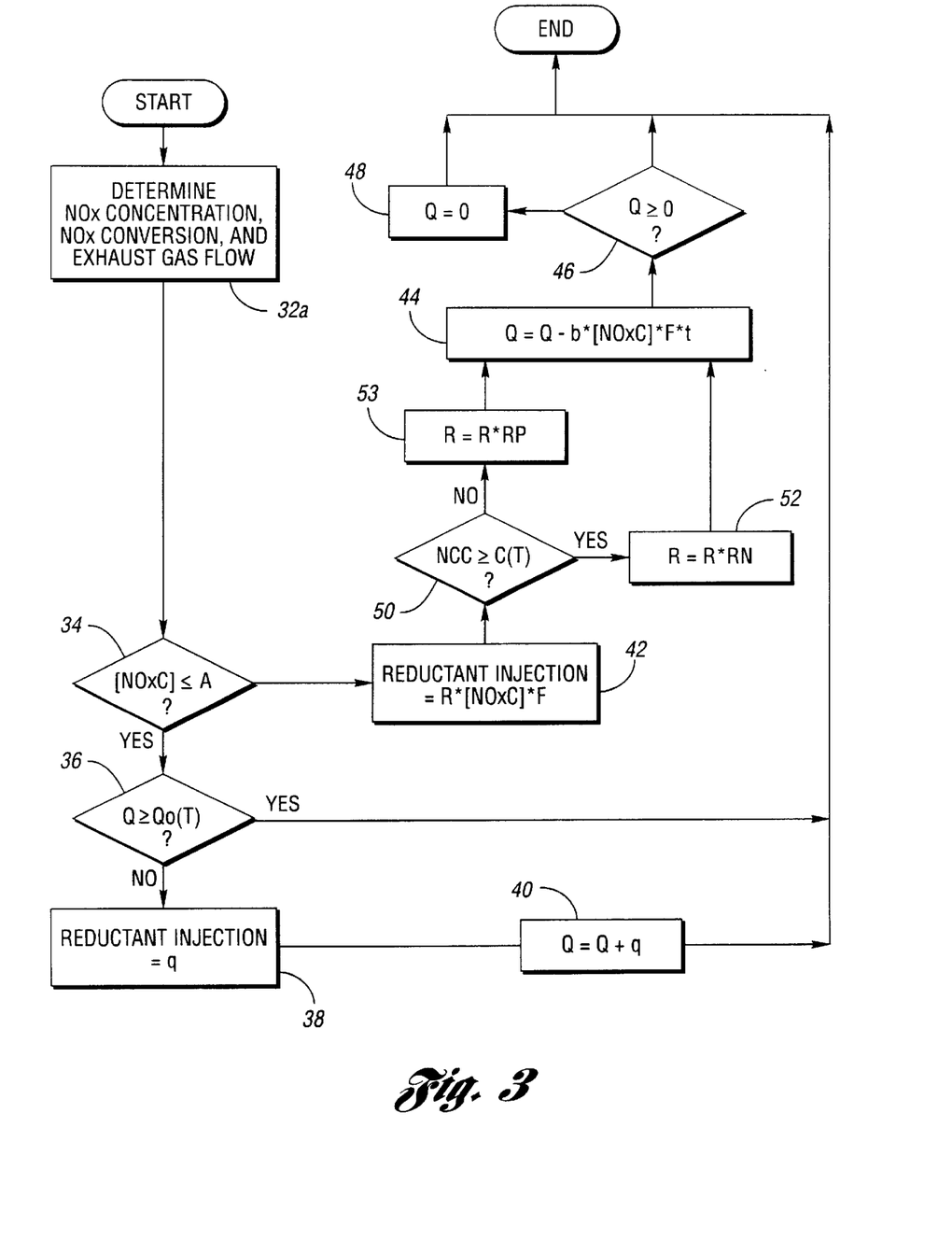

A second embodiment of the invention is shown in FIG. 3 for a system configuration that includes the $NO_X$ sensor 28 in addition to the catalyst temperature sensor 26 but does not include the NH3 sensor 30. Components in FIG. 3 that are the same as those in FIG. 2 have been identified with the same numerals. The method depicted in FIG. 3 includes the additional steps of determining, in block 32a, the $NO_X$ concentration values $[NO_X]$ obtained from $NO_X$ sensor 28, and a $NO_X$ conversion value NCC determined as follows:

$$NCC=1-([NO_X]/[NO_XC])$$

Also, if $[NO_XC]$ is greater than the threshold A, further steps include checking, at decision block 50, whether the $NO_X$ conversion value NCC exceeds a threshold value C(T) which varies with catalyst temperature. If so, then the injection rate is reduced the next time through the loop by decreasing R, as indicated in block 52 where R is multiplied by a predetermined factor RN that is preferably between 0.5 and 1. On the other hand, if NCC is less than or equal to C(T), then the injection rate is increased the next time through the loop by increasing R, as indicated in block 53 where R is multiplied by a predetermined factor RP that is preferably between 1 and 2. Thus, data from the optional $NO_X$ sensor is used to adjust the reductant injection rate to save reductant when the $NO_X$ conversion is above temperature dependent threshold value C(T) and the calculated $NO_X$ concentration is greater than a threshold value A. As in FIG. 2, the blocks 44, 46 and 48 provide for reduction in Q while preventing a negative value.

Figure 4:
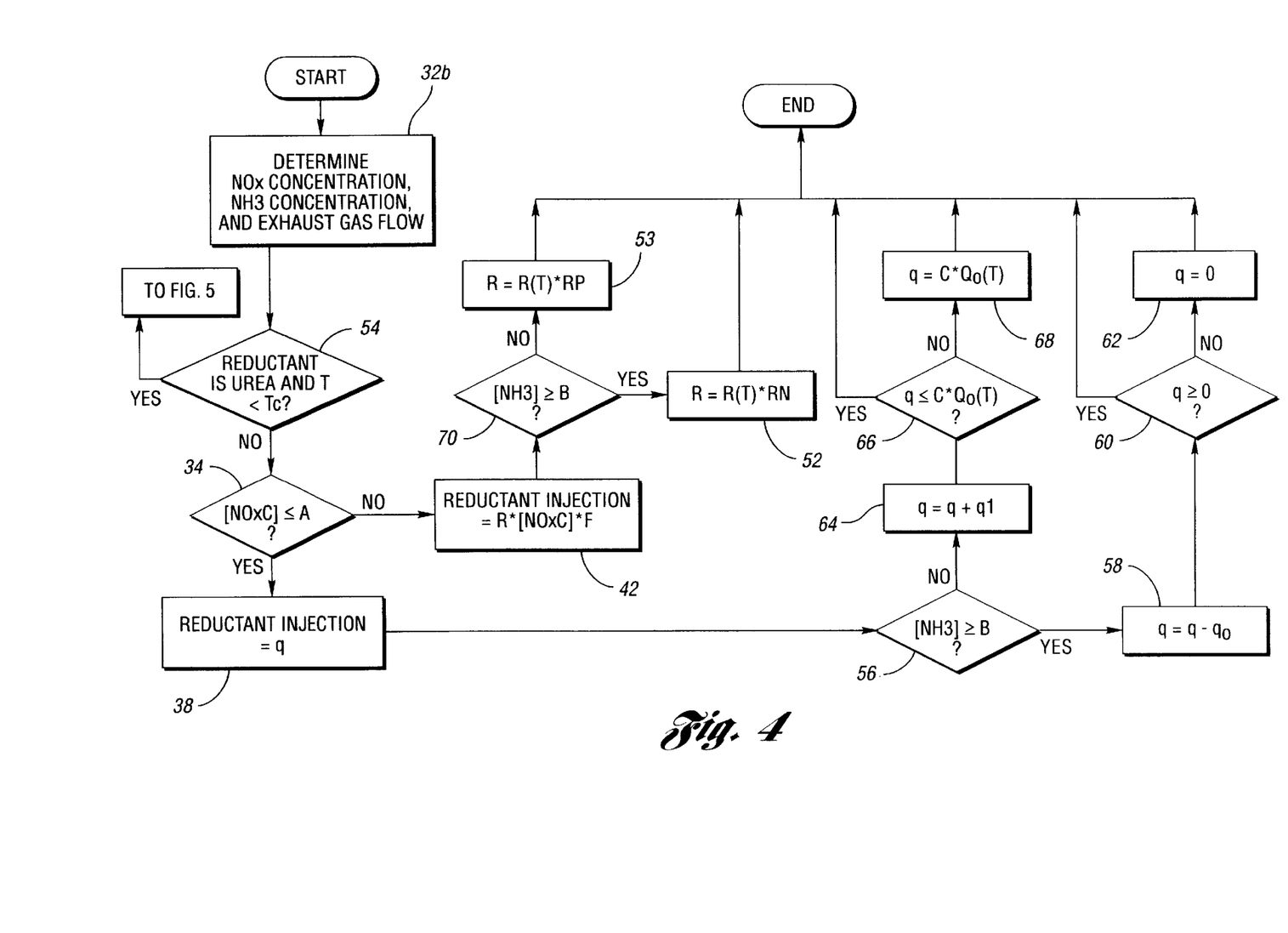
Figure 5:
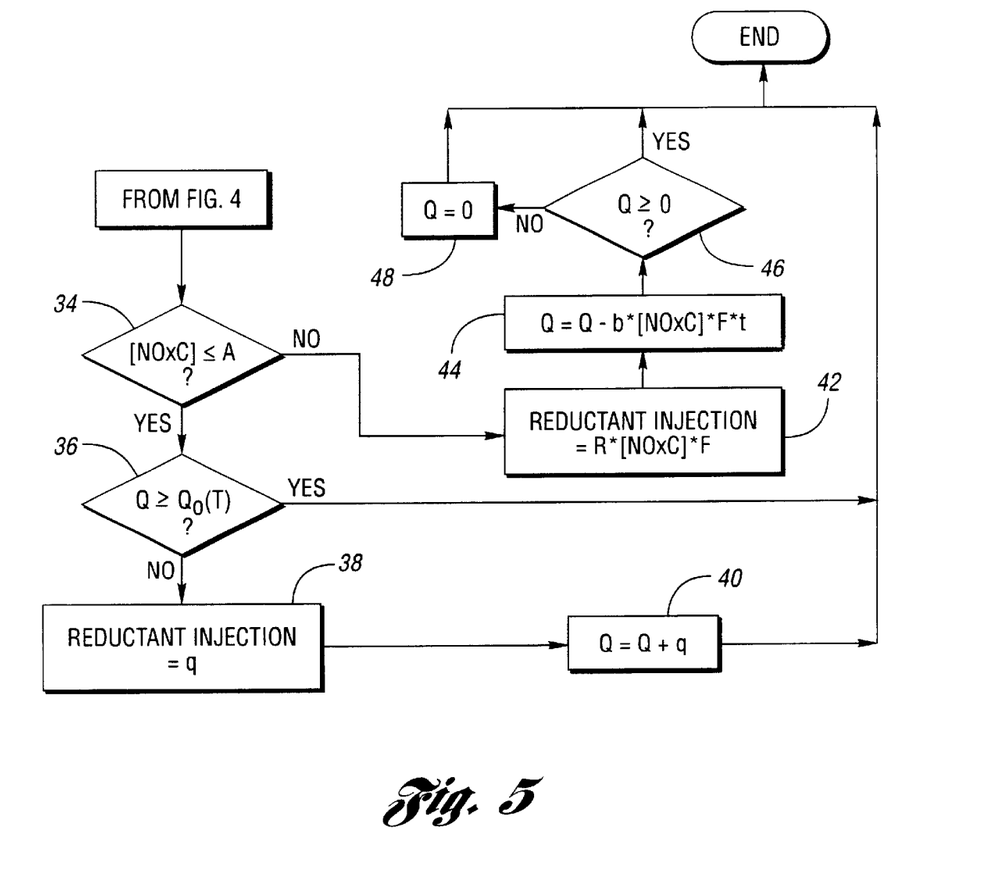

A third embodiment is depicted in FIGS. 4 and 5 for a system configuration that includes the NH3 sensor 30 in addition to the catalyst temperature sensor 26 but does not include the $NO_X$ sensor 28. Components in FIG. 4 that are the same as those in FIGS. 2 and 3 have been identified with the same numerals. The method depicted in FIGS. 4 and 5 includes the additional step of determining an ammonia value [NH3] from the ammonia sensor 30, as indicated in block 32b. If the reductant is urea and the catalyst temperature is less than a predetermined temperature $T_c$, as determined in block 54, then the logic in FIG. 5 is followed. The FIG. 5 logic is the essentially the same as that followed in FIG. 2. Also, if $[NO_XC]$ is not greater than the threshold A, as determined in block 34, and [NH3] is equal to or greater than a threshold value B where ammonia slip occurs, as determined in block 56, then the reductant amount q is reduced at block 58 by an amount $q_0$ at block 58 so that the next time through the loop the amount injected at block 38 will be reduced. Ammonia slip is experienced when ammonia in excess of that used to reduce the nitrogen oxides passes through the catalyst unaffected and exits the catalyst. A check is made at block 60 to determine if q is negative and if so q is reset to 0 at block 62. On the other hand, if ammonia slippage is not occurring, as determined at block 56, then the reductant amount q is increased at block 64 by an amount $q_1$. At block 66, a check is made to insure that q does not get too large (q=<C*$Q_0$(T)), when [NH3]<B. If q is too large, excessive ammonia slippage may occur. In the equation for q, $Q_0$(T) is the catalyst storage capacity, C is a constant which is a percentage of the $Q_0$(T) for example 20%. The C value is preferably determined through a catalyst storage test, for each specific catalyst. Accordingly, q is limited to the value C*$Q_0$(T) by block 68.

If $[NO_XC]$ is greater than the threshold A, as determined at block 34, then the next time through the loop the amount of reductant injected is reduced, by decreasing R in block 52, if [NH3] is equal to or greater than the threshold B, as determined in block 70. On the other hand, the amount of reductant injected is increased, by increasing R in block 54, if [NH3] is less than the threshold B. Thus, data from the optional ammonia sensor 26 is used to adjust the amount of reductant injected in order to reduce ammonia slippage.

Figure 6:
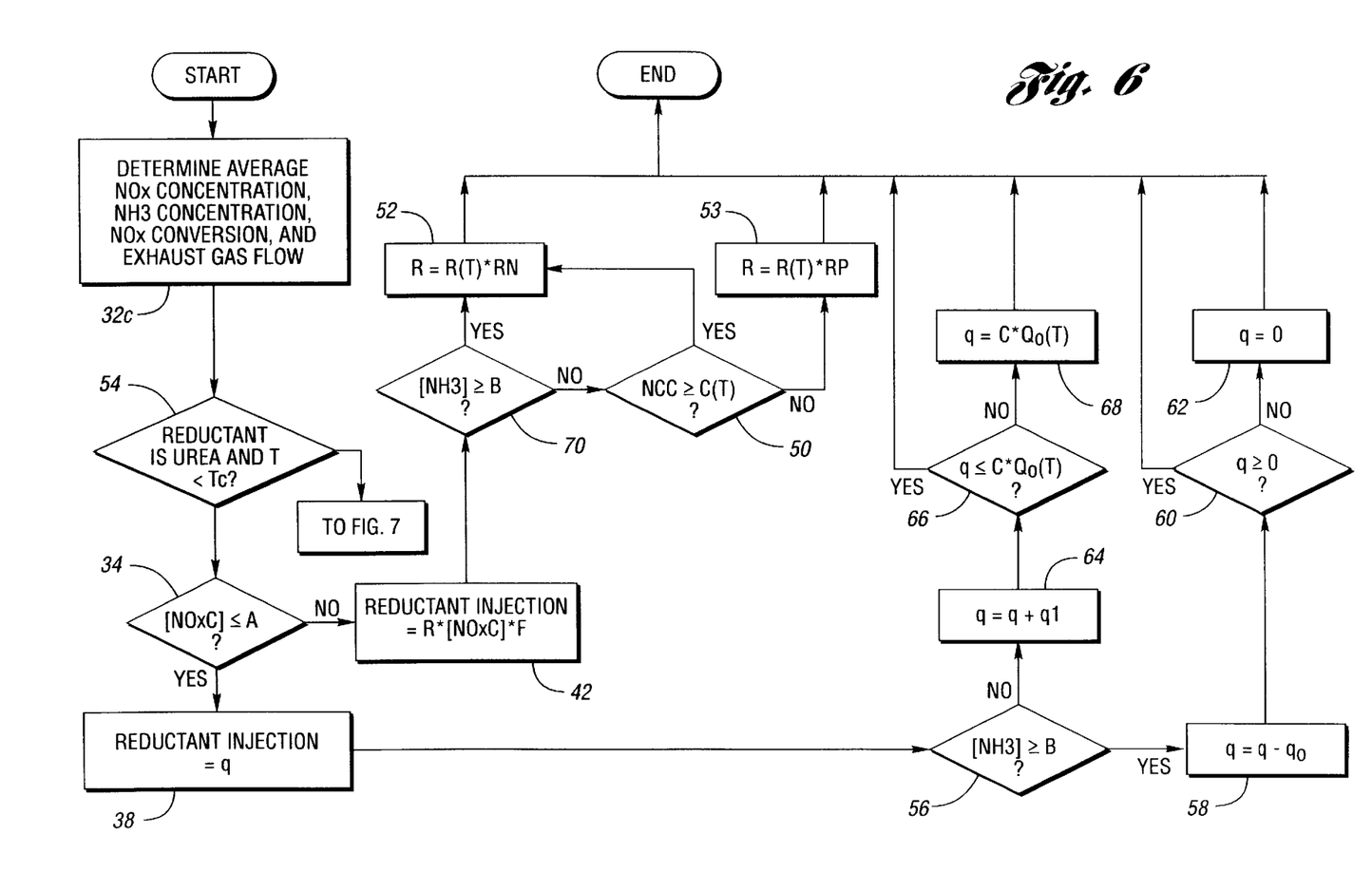
Figure 7:
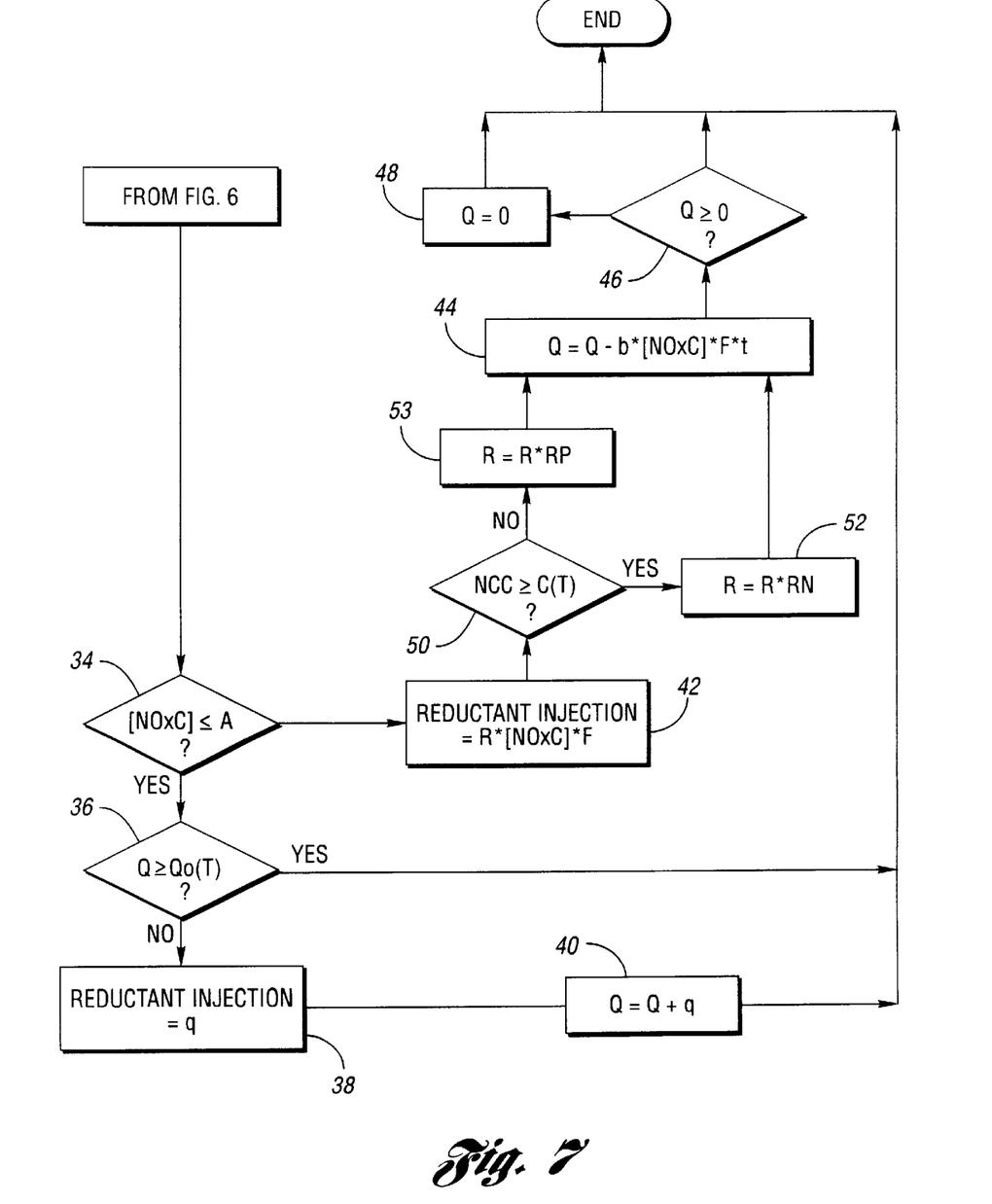

A fourth embodiment is shown in FIGS. 6 and 7 for a system configuration that includes both the $NO_X$ sensor 28 and the NH3 sensor 30 in addition to the catalyst temperature sensor 26. Components in FIGS. 6 and 7 that are the same as those in FIGS. 2–4 have been identified with the same numerals. The method depicted in FIGS. 6 and 7 includes, in addition to the steps depicted in FIG. 4, the step of calculating, in block 32c, the $NO_X$ conversion value $NCC=1-([NO_X]/[NO_XC])$, discussed above in connection with FIG. 3. Also, if the reductant is urea and the catalyst temperature is less than a predetermined temperature $T_c$, as determined in block 54, then the logic in FIG. 7 is followed. The FIG. 7 logic is the essentially the same as that followed in FIG. 3. Also, if $[NO_XC]$ is greater than the threshold A, then if either [NH3] is equal to or greater than the threshold B, as determined in block 70, or NCC is equal to or greater than the temperature dependent threshold value C(T), as determined in block 50, the injection rate is reduced the next time through the loop by decreasing R by the reducing factor RN, as indicated in block 42. Otherwise, the injection rate is increased the next time through the loop by increasing R by the factor RP, as indicated in block 54. Thus, data from both the $NO_X$ and NH3 sensors is used to adjust the reductant injection rate under all $NO_X$ concentrations.

As indicated previously in connection with the discussions of FIGS. 4 and 6, a check is made at block 54 to determined whether the reductant is urea and whether the catalyst temperature is less than a predetermined temperature $T_c$. Preferably, $T_c$ is about 230° C. Both conditions must be met in order to proceed with the approached depicted in FIGS. 4 and 6. Since urea only partially decomposes to ammonia below $T_c$, it is preferable to rely on the logic of FIGS. 5 and 7 rather than rely on ammonia slip detection for control of reductant injection under these circumstances. Whether or not the reductant being used is ammonia is programmed in memory at the time of manufacture so this check can be made.

While the best mode for carrying out the invention has been described in detail, those familiar with the art to which this invention relates will recognize various alternative designs and embodiments for practicing the invention as defined by the following claims.

What is claimed is:

1. A method for controlling reductant injection into an engine exhaust stream upstream of a selective reduction catalyst coupled to said engine, the method comprising the steps of:

determining a $NO_X$ concentration level upstream of said catalyst;

controlling the amount of reductant injected into the engine exhaust stream proportional to the $NO_X$ concentration if the $NO_X$ concentration level is greater than a predetermined $NO_X$ concentration level; and injecting a predetermined amount of reductant into the engine exhaust stream if the $NO_X$ concentration level is less than said predetermined $NO_X$ concentration level and the amount of ammonia in the catalyst is less than the ammonia storage capacity of the catalyst.

2. The method of claim 1 comprising the additional steps of:

determining the exhaust gas flow rate;

reducing the value of a variable Q, indicative of catalyst ammonia storage capacity, by an amount proportional to said $NO_X$ concentration level and said flow rate if said $NO_X$ concentration is greater than said predetermined $NO_X$ concentration level.

3. The method of claim 2 comprising the additional steps of:

determining catalyst temperature; and injecting said predetermined amount of reductant into the exhaust stream only if the value of the variable Q is less than a catalyst temperature dependent value indicative of the ammonia storage capacity of said catalyst.

4. The method of claim 1 comprising the additional steps of:

determining a $NO_X$ conversion value; and if said $NO_X$ concentration is greater than said predetermined $NO_X$ concentration level and said $NO_X$ conversion value is less than a threshold value increasing the amount of reductant injected by a predetermined amount; and if said $NO_X$ concentration is greater than said predetermined $NO_X$ concentration level and said $NO_X$ conversion value is greater than said threshold value, reducing the amount of reductant injected by a second predetermined amount.

5. The method of claim 4 comprising the additional steps of:

determining the exhaust gas flow rate;

reducing the value of a variable Q, indicative of catalyst ammonia storage capacity, by an amount proportional to said $NO_X$ concentration level and said flow rate if said $NO_X$ concentration is greater than said predetermined $NO_X$ concentration level.

6. The method of claim 4 comprising the additional steps of:

determining catalyst temperature; and injecting a predetermined amount of reductant into the exhaust stream if the $NO_X$ concentration level is less than said predetermined $NO_X$ concentration level and the value of the variable Q is less than a temperature dependent value indicative of the ammonia storage capacity of said catalyst.

7. The method of claim 1 comprising the additional steps of:

determining an ammonia concentration level downstream of said catalyst;

determining catalyst temperature; and increasing the amount of reductant injected by a predetermined amount if said $NO_X$ concentration is greater than said predetermined $NO_X$ concentration level and said ammonia concentration level is less than an ammonia slippage level; and decreasing the amount of reductant injected by a second predetermined amount if said $NO_X$ concentration is greater than said predetermined $NO_X$ concentration level and said ammonia concentration level is greater than said ammonia slippage level.

8. The method of claim 1 comprising the additional steps of:

determining an ammonia concentration level downstream of said catalyst; and increasing the amount of reductant injected by a predetermined incremental value if said $NO_X$ concentration is less than said predetermined $NO_X$ concentration level and said ammonia concentration level is less than an ammonia slippage level; and reducing the amount of reductant injected by a second predetermined incremental value if said $NO_X$ concentration is less than said predetermined $NO_X$ concentration level and said ammonia concentration level is greater than said ammonia slippage level.

9. The method of claim 7 comprising the additional steps of:
increasing the amount of reductant injected by a predetermined incremental value if said $NO_X$ concentration is less than said predetermined $NO_X$ concentration level and said ammonia concentration level is less than an ammonia slippage level; and
reducing the amount of reductant injected by a second predetermined incremental value if said $NO_X$ concentration is less than said predetermined $NO_X$ concentration level and said ammonia concentration level is greater than said ammonia slippage level.

10. The method of claim 7 comprising the additional step of:
limiting the amount of reductant injected to a predetermined percentage of the catalyst ammonia storage capacity, whenever said $NO_X$ concentration level is less than said predetermined $NO_X$ concentration level and said ammonia concentration level is less than said ammonia slippage level.

11. The method of claim 8 comprising the additional steps of:
determining whether the reductant being used is urea and whether the catalyst temperature is below a predetermined temperature; and
performing the steps of claim 8 only if the reductant is not urea or the catalyst temperature is greater than said predetermined temperature.

12. The method of claim 1 comprising the additional steps of:
determining a $NO_X$ conversion value;
determining an ammonia concentration level downstream of said catalyst; and
increasing the amount of reductant injected by a predetermined amount if said $NO_X$ concentration is greater than said predetermined $NO_X$ concentration level, said $NO_X$ conversion value is less than a threshold value, and said ammonia concentration level is less than an ammonia slippage level; and
reducing the amount of reductant injected by a second predetermined amount if said $NO_X$ concentration is greater than said predetermined $NO_X$ concentration level, said $NO_X$ conversion value is greater than said threshold value, and said ammonia concentration level is greater than said ammonia slippage level.

13. The method of claim 12 comprising the additional steps of:
increasing the amount of reductant injected by a predetermined incremental value if said $NO_X$ concentration is less than said predetermined $NO_X$ concentration level and said ammonia concentration level is less than an ammonia slippage level; and
reducing the amount of reductant injected by a second predetermined incremental value if said $NO_X$ concentration is less than said predetermined $NO_X$ concentration level and said ammonia concentration level is greater than said ammonia slippage level.

14. A system for controlling reductant injection into an internal combustion engine exhaust stream upstream of a catalyst coupled to said engine, comprising:
means for determining a $NO_X$ concentration level upstream of said catalyst;

means for controlling reductant injection as a function of $NO_X$ concentration if the $NO_X$ concentration level is greater than a predetermined $NO_X$ concentration level and for injecting a predetermined amount of reductant into the exhaust stream if the $NO_X$ concentration level is less than said predetermined $NO_X$ concentration level and the amount of ammonia in the catalyst is less than the catalyst ammonia storage capacity.

15. The system of claim 14 further comprising:
means for determining an ammonia concentration level downstream of said catalyst;
means for increasing the amount of reductant injected by a predetermined amount if said $NO_X$ concentration is greater than said predetermined $NO_X$ concentration level and said ammonia concentration level is less than an ammonia slippage level and for decreasing the amount of reductant injected by a second predetermined amount if said $NO_X$ concentration is greater than said predetermined $NO_X$ concentration level and said ammonia concentration level is greater than said ammonia slippage level; and
means for increasing the amount of reductant injected by a predetermined incremental value if said $NO_X$ concentration is less than said predetermined $NO_X$ concentration level and said ammonia concentration level is less than an ammonia slippage level and for reducing the amount of reductant injected by a second predetermined incremental value if said $NO_X$ concentration is less than said predetermined $NO_X$ concentration level and said ammonia concentration level is greater than said ammonia slippage level.

16. The system of claim 14 further comprising:
means for determining a $NO_X$ conversion value;
means for determining an ammonia concentration level downstream of said catalyst;
means for increasing the amount of reductant injected by a predetermined amount if said $NO_X$ concentration is greater than said predetermined $NO_X$ concentration level, said $NO_X$ conversion value is less than a threshold value, and said ammonia concentration level is less than an ammonia slippage level and for reducing the amount of reductant injected by a second predetermined amount if said $NO_X$ concentration is greater than said predetermined $NO_X$ concentration level, said $NO_X$ conversion value is greater than said threshold value, and said ammonia concentration level is greater than said ammonia slippage level; and
means for increasing the amount of reductant injected by a predetermined incremental value if said $NO_X$ concentration is less than said predetermined $NO_X$ concentration level and said ammonia concentration level is less than an ammonia slippage level and for reducing the amount of reductant injected by a second predetermined incremental value if said $NO_X$ concentration is less than said predetermined $NO_X$ concentration level and said ammonia concentration level is greater than said ammonia slippage level.

17. An article of manufacture comprising:
a computer storage medium having a computer program encoded therein for controlling reductant injection into the exhaust stream of an internal combustion engine, upstream of a selective reduction catalyst coupled to said engine, said computer storage medium comprising:
code for causing the computer to determine a $NO_X$ concentration level upstream of said catalyst;

code for causing the computer to control the amount of reductant injected proportional to $NO_X$ concentration if the $NO_X$ concentration level is greater than a predetermined $NO_X$ concentration level and to inject a predetermined amount of reductant if the $NO_X$ concentration level is less than said predetermined $NO_X$ concentration level and the amount of ammonia in the catalyst is less than the ammonia storage capacity of the catalyst.

18. The article of claim 17 further comprising:

code for causing the computer to determine a $NO_X$ conversion value; and code for causing the computer to increase the amount of reductant injected by a predetermined amount if said $NO_X$ concentration is greater than said predetermined $NO_X$ concentration level and said $NO_X$ conversion value is less than a threshold value and to reduce the amount of reductant injected by a second predetermined amount if said $NO_X$ concentration is greater than said predetermined $NO_X$ concentration level and said $NO_X$ conversion value is greater than said threshold value.

19. The article of claim 17 further comprising:

code for causing the computer to determine a $NO_X$ conversion value;

code for causing the computer to determine an ammonia concentration level downstream of said catalyst;

code for causing the computer to increase the amount of reductant injected by a predetermined amount if said $NO_X$ concentration is greater than said predetermined $NO_X$ concentration level, said $NO_X$ conversion value is less than a threshold value, and said ammonia concentration level is less than an ammonia slippage level and to reduce the amount of reductant injected by a second predetermined amount if said $NO_X$ concentration is greater than said predetermined $NO_X$ concentration level, said $NO_X$ conversion value is greater than said threshold value, and said ammonia concentration level is greater than said ammonia slippage level; and code for causing the computer to increase the amount of reductant injected by a predetermined incremental value if said $NO_X$ concentration is less than said predetermined $NO_X$ concentration level and said ammonia concentration level is less than an ammonia slippage level and to reduce the amount of reductant injected by a second predetermined incremental value if said $NO_X$ concentration is less than said predetermined $NO_X$ concentration level and said ammonia concentration level is greater than said ammonia slippage level.

20. A method for controlling reductant injection into an engine exhaust stream upstream of a catalyst coupled to said engine, the method comprising the steps of:

determining an engine-out $NO_X$ concentration level;

controlling the amount of reductant injected into the engine exhaust stream as a function of the $NO_X$ concentration if the $NO_X$ concentration level is greater than a predetermined $NO_X$ concentration level;

determining the exhaust gas flow rate;

reducing the value of a variable Q, indicative of catalyst reductant storage capacity, by an amount proportional to said $NO_X$ concentration level and said flow rate if said $NO_X$ concentration is greater than said predetermined $NO_X$ concentration level.

* * * * *